United States Patent [19]

Renner

[11] 3,723,883

[45] Mar. 27, 1973

[54] AUTOMATIC NOISE NULLING CIRCUIT

[76] Inventor: Darwin S. Renner, 1314 Cedar Hill Avenue, Dallas, Tex. 75208

[22] Filed: Feb. 23, 1972

[21] Appl. No.: 228,535

Related U.S. Application Data

[63] Continuation-in-part of Ser. No. 863,004, Aug. 26, 1969, abandoned.

[52] U.S. Cl...................................325/476, 325/475

[51] Int. Cl..............................................H04b 1/12

[58] Field of Search.....324/82, 83 Q, 83 FE; 325/65, 325/67, 324, 363, 378, 475, 476

[56] References Cited

UNITED STATES PATENTS

| | | | |
|---|---|---|---|
| 2,311,696 | 2/1943 | Rubin | 325/475 |
| 3,409,834 | 11/1968 | Cullis et al. | 325/324 |

*Primary Examiner*—Albert J. Mayer
*Attorney*—Warren H. Kintzinger et al.

[57] ABSTRACT

An automatic noise nulling circuit for use with a signal transmission system with noise sensed and nulled from the signal path. Noise is nulled out by a null signal input with substantially no distortion of desired signal transmission and without altering the signal transmission characteristics of the signal path through the system.

18 Claims, 4 Drawing Figures

FIG. I

AUTOMATIC NOISE NULLING CIRCUIT

Figure 1:
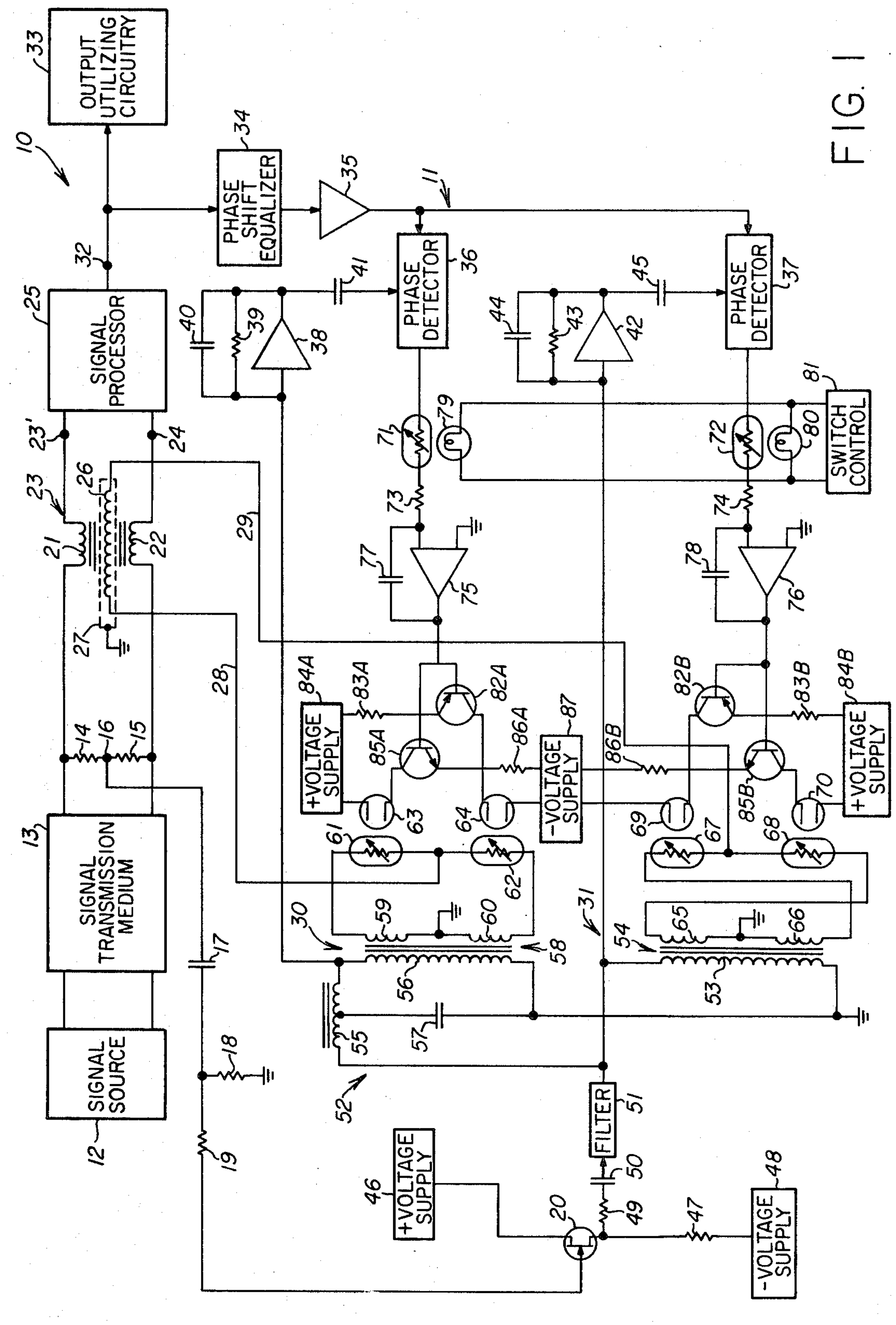

This is a continuation-in-part application of U.S. Pat. application Ser. No. 863,004 filed Aug. 26, 1969, and now abandoned entitled "Interference Eliminator" with common inventor herewith.

This invention relates in general to noise elimination in electronic signal transmitting and processing systems, and in particular, to an automatic noise nulling circuit using a noise countering signal input for nulling noise from a signal transmission system.

Any electronic system detecting and processing signals to a useful output is usually plagued by undesired interference or noise to a greater or lesser degree. Such undesired noise may have any of several characteristics either singly or in any of many combinations and is a very significant problem particularly where very sensitive instruments are employed in a through signal path for obtaining sensitive readings and data outputs. Signal averaging is one approach used for minimizing noise, however, the signal must be repeated many times in attaining a significant amount of noise attenuation. This can be both expensive in time and materials and many times averaging is simply too slow to be practical. Band limiting is another noise control approach often used as a matter of convenience, however, if both the noise and signal generally occupy the same bands, a common condition, then this approach results in adverse signal loss. Noise limiting and squelch are useful in minimizing undesired impulse noise of relatively short time duration with amplitudes exceeding those of the signal. Here, however, this approach is not effective with noises having relatively large time spans and generally of equal level to that of the signal. Obviously, where the signal amplitudes have wide ranges noise treatment based on an amplitude basis just cannot be employed. Manual adjustment as a noise control approach is much too time consuming and many times not effective with time shift variability of the noise. Thus, it appears that noise cancellation is an alternate that may be automatic in responding to rapid changes in noise interference and/or where many signal channels may be involved.

It is, therefore, a principal object of this invention to provide an automatic noise cancelling circuit for a signal transmission system.

Another object is to insert noise cancelling signal input into a signal transmission and/or processing system to minimize noise content where desired in a noise nulling action.

A further object is to accomplish noise cancellation nulling from a signal transmission system with substantially no distortion of desired signal transmission.

Still another object with such a noise cancellation nulling system is to avoid altering the signal transmission characteristics of the signal path through the system.

Another object is to provide a noise cancelling system optimizing the recovery of signal intelligence from very weak signal levels deep in noise environments.

Features of the invention useful in accomplishing the above objects include, in an automatic noise nulling circuit, a noise cancellation approach with noise sensed from the signal transmission path system, or from an independent source, resolved to substantially 90° scalar vectors and automatically magnitude varied for optimized noise cancellation. The scalar vectors are varied by magnitude control with system sensed feedback and the vector inputs optimized for substantially complete noise elimination at a desired location in the signal transmitting-processing circuit system.

Specific embodiments representing what are presently regarded as the best modes of carrying out the invention are illustrated in the accompanying drawings.

Figure 2:
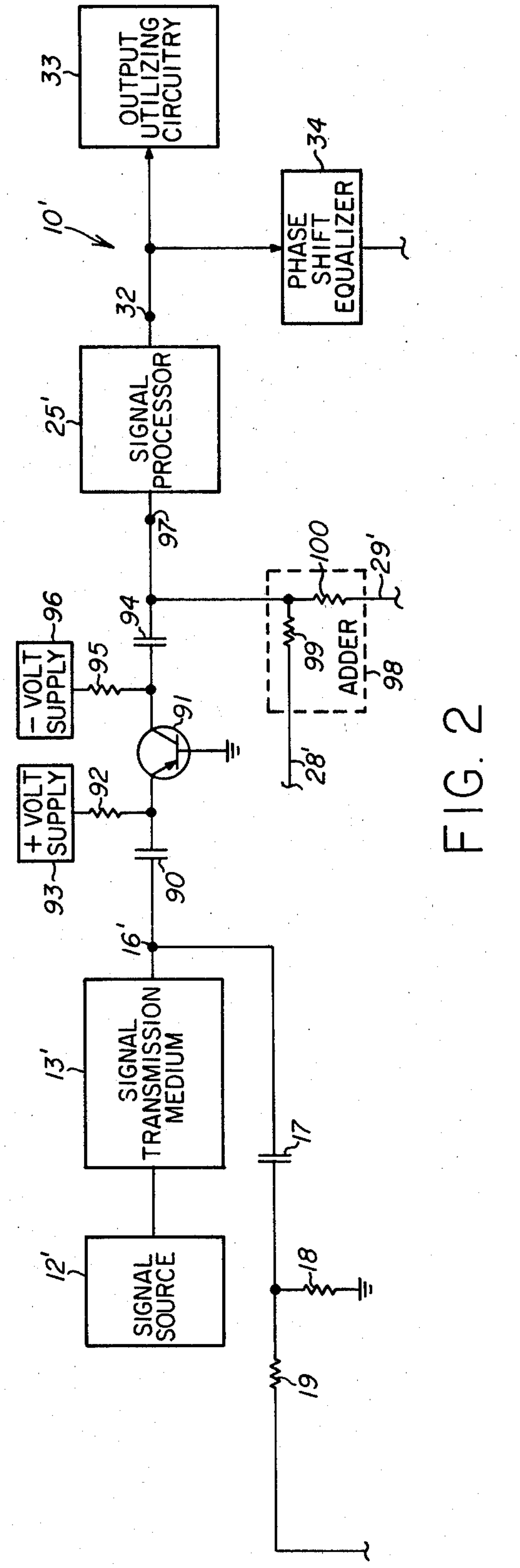
Figure 4:
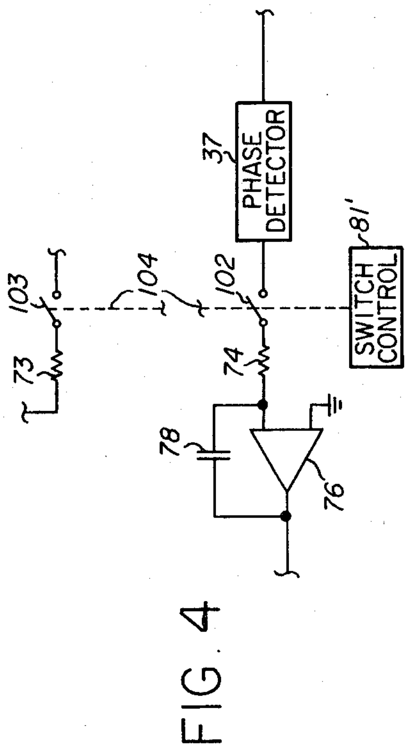
Figure 3:
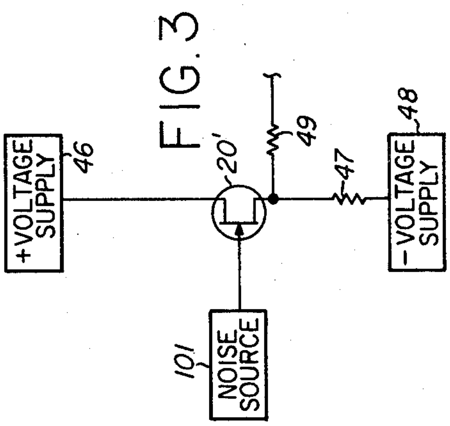

In the drawings:

FIG. 1 represents a combination block schematic diagram of applicant's automatic noise nulling circuit used with a signal transmitting and processing system, FIG. 2, a partial combination block schematic diagram of an alternate noise nulling circuit embodiment with a different signal transmitting and processing system, FIG. 3, a modification with noise sensed from an independent noise source, and FIG. 4, an alternate switch control system to that employed with the embodiment of FIG. 1.

Referring to the drawings:

The signal transmitting and processing system 10 of FIG. 1, equipped with an automatic noise nulling circuit 11, is shown to have a signal path extended from signal source 12 through a two line system to and through a signal transmission medium 13. Signal transmission medium 13 may be a radio communication system including a transmitter and a receiver, a two wire transmission system, a delay line, or other signal transmission means. the two wire balanced output from signal transmission medium 13 is interconnected by series connected resistors 14 and 15 with a common connection 16 connected as a noise sensing point to and through capacitor 17 to the junction of resistor 18, connected at its other end to ground, and resistor 19. The noise signal path extends through resistor 19 and on to the base input connection of field effect transistor 20.

The two wire balanced output from signal transmission medium 13 is connected to and through balanced equal coils 21 and 22 respectively, of balanced transformer 23, to connection terminals 23' and 24 of signal processor unit 25. The balanced transformer 23, that also acts as a one way coupling isolating the noise sensing point 16 from signal processor unit 25 and the noise countering signal input location in the signal transmitting path through system 10, has a primary coil 26 partially shielded by grounded shield 27. The primary coil 26 has opposite ends connected, respectively, through lines 28 and 29 to 90° vector scalar magnitude control circuits 30 and 31.

The signal processor 25 may be any one of many signal processing units such as a sensitive electric signal sensor used in geophysical analysis, or a sensitive signal sensor. In any event, different signal processor units 25 may be inserted in the circuit connected at terminal points 23', 24 and 32 with each contributing its own noise and phase shift factors. The output of the specific signal processor 25 installed in the circuit any particular time is connected as an input via connection terminal 32 to output utilizing circuitry 33 that may be an instrument pen tape recorder, a signal recorder, or a speaker. The output of signal processor unit 25 is also connected through terminal point 32 to phase shift equalizer circuit 34 that is adjusted for phase shift variations inherent between different signal processor units 25 inserted into the circuit 10. The output of phase shift equalizer circuit 34 is connected as an input to amplifier 35 with an output connected as inputs to both phase detector (synchronous detectors) circuits 36 and 37. The other input to phase detector circuit 36 is from amplifier 38, parallelled by resistor 39 and capacitor 40, through signal coupling capacitor 41. The other input to phase detector circuit 37 is from amplifier 42, parallelled by resistor 43 and capacitor 44, through signal coupling capacitor 45.

Referring back to the sensed noise input circuitry, field effect transistor 20 has an electrode connected to a positive voltage supply 46 and an output electrode connected through resistor 47 to minus voltage supply 48. The output electrode of FET transistor 20 is also connected serially, through resistor 49, capacitor 50 and filter circuit 51 to broadband 90° phase shift resolver circuit 52. The filter 51, optional in some embodiments, is effective in shaping or modifying the cancelling signal such that it more nearly resembles the interference. The cancelling sub signal is passed from filter 51 to resolver circuit 52 where it is separated into two orthogonal components. Resolver circuit 52 includes direct connection of the output from filter 51 to one end of transformer primary coil 53 connected at the other end to ground with the coil 53 responsive to one orthogonal component axis of the signal content passed from filter 51. Coil 53 is also the primary signal input coupling coil of plus-minus noise component magnitude adjuster transmission scalar circuit transformer 54. The cancelling sub signal is also passed from filter 51 to and through coil 55 to one end of transformer primary coil 56 connected at the other end to ground. Coil 55 also has a tap connection through capacitor 57 to ground. The component values of coils 55 and 56, and capacitor 57 and the circuit interconnections thereof are such that this portion of resolver circuit 52 is responsive to orthogonal signal component content substantially at right angles to the axis of orthogonal signal component content response of transformer primary coil 53. Coil 56 is also the primary signal input coupling coil of plus-minus noise component magnitude adjuster transmission scalar circuit transformer 58. Respective orthogonal signal component responses appearing at the top of transformer primary coils 53 and 56 are also passed directly through circuit connections as inputs, respectively, to amplifiers 42 and 38.

Scalar circuit transformer 58 has two balanced value secondary coils 59 and 60 having a common ground connection and their other ends connected respectively to outer ends of light intensity variable resistors 61 and 62. Resistors 61 and 62 that are illuminated, respectively, by neon bulbs 63 and 64 have a common junction connection through line 28 to one end of primary coil 26 of balanced transformer 23. In like arrangement scalar circuit transformer 54 has two balanced value secondary coils 65 and 66 having a common ground connection and their other ends connected respectively to outer ends of light intensity variable resistors 68 and 67. Resistors 67 and 68 that are illuminated, respectively, by neon bulbs 69 and 70 have a common junction connection through line 29 to the opposite end of primary coil 26 from the line 28 connection thereto.

The resultant amplified and leveled signal through amplifier 35 as detected with the sub signal component inputs from amplifiers 38 and 42 in synchronous detectors 36 and 37, respectively, derive dc voltage outputs controlling the scalar circuits 30 and 31. The outputs of synchronous detectors 36 and 37 are passed to and through light intensity variable resistors 71 and 72, respectively, and on through resistors 73 and 74 as inputs to operational amplifiers 75 and 76 having connections to ground and connected in parallel with capacitors 77 and 78 input to output. There is such capacitive negative feedback via capacitors 77 and 78 that the outputs of amplifiers 75 and 76 remain at their last previous values, respectively, when the resistors 71 and 72 become so highly resistive as to be effectively open switches. Actually resistors 71 and 72 are employed as electronic switches, open when lights 79 and 80 are off and closed when the lights 79 and 80 are on. Lights 79 and 80 are controlled by switch control 81 to which they are connected either by manual control thereof or through automatic control for switch off periods of data processing in the signal system.

The outputs of operational amplifiers 75 and 76 are connected, respectively, to the bases of PNP transistors 82A and 82B having emitters connected through resistors 83A and 83B to positive voltage supplies 84A and 84B that while shown as separate voltage supplies may be a single supply. The outputs of amplifiers 75 and 76 are also connected, respectively, to the bases of NPN transistors 85A and 85B having emitters connected through resistors 86A and 86B to negative voltage supply 87. Further, the collectors of NPN transistors 85A and 85B are connected, respectively through neon light bulbs 63 and 70 to positive voltage supplies 84A and 84B while the collectors of PNP transistors 82A and 82B are connected, respectively, through neon light bulbs 64 and 69 to minus voltage supply 87. With this system as the outputs of either of amplifiers 75 and 76 becomes more positive the respective NPN transistor 85A and/or 85B conduct more current making the respective neon bulb 63 and/or 70 brighter, and simultaneously PNP transistor 82A and/or 82B conduct less current thereby dimming the respective neon bulbs 64 and 69. This results in light intensity variable resistors 61 and 66 becoming less resistive and simultaneously resistors 62 and 67 becoming more resistive thereby adjusting the magnitude and at times changing the polarity of the respective scalar vectors. Obviously, these operate in reverse with opposite shifts in dc voltage outputs of operational amplifiers 75 and 76. Thus, the scalar vectors are subject to automatic feedback controlled adjustment for optimized corrective noise null cancelling signal input to the signal transmission system as long as the resistor switches 71 and 72 are conducting as turned on switches. When resistor switches 71 and 72 are turned off and highly resistive the operational amplifiers retain their last previously set dc output level and freeze the scalar vector adjustments for a test interval.

Referring to the embodiment of FIG. 2 the signal transmitting and processing system 10' employs a common ground return (detail not shown) with a single signal line from signal source 12' to signal transmission medium 13'. The single signal line output from signal transmission medium 13' extends to connection point 16′ that is connected both to signal coupling capacitor 90 and also as a noise sensing point to and through capacitor 17 to the junction of resistors 18 and 19. The other side of capacitor 90 is counted to the emitter of PNP transistor 91, having a base connection to ground, and also through resistor 92 to positive voltage supply 93. The collector of transistor 91 is connected to signal coupling capacitor 94 and also through resistor 95 to minus voltage supply 96. The other side of capacitor 94 is connected to connection terminal 97 of signal processor 25′ and also to adder circuit 98 with a common junction of resistors 99 and 100 connected to the junction of capacitor 94 and terminal 97 as the noise countering signal input to the signal transmitting and processing system 10′. The output terminal 32 of signal processor 25′ is connected to both output utilizing circuitry 33 and phase shift equalizer 34 just as with the embodiment of FIG. 1 with portions not shown in FIG. 2 being substantially the same as those of FIG. 1 subject of course to reasonable variations that may be accomplished with the embodiment of FIG. 1. Obviously, resistor 19 would be connected to a 90° phase shift resolver circuit through intervening circuitry, lines 28′ and 29′ would be connected to 90° vector scalar magnitude control circuits 30 and 31, and the output of phase shift equalizer 34 would be connected in the feedback loop through amplifier 35 to synchronous detectors 36 and 37.

It should be realized that there are occasions that phase shift equalizer 34 would not be required such as where the phase relations at the feed-back sampling point are substantially correct within the loop. Further, amplifier 35 would not be required in some systems with, for example, terminal 35 being connected directly as an input to synchronous detectors 36 and 37. Still further, resistor switches 71 and 72, or their equivalent, may be dispensed with in some embodiments where testing intervals are relatively short as compared to noise parameter shift. Different biasing networks and feedback voltage shift controlled scalar networks may be employed in place of the specific individual component and circuit sections shown. Various portions of the noise source circuit are subject to change to suit various circuit uses and environments with, for example, filter 51 being eliminated from some embodiment variations.

With the noise source change of FIG. 3 noise source 101 is an independent noise source used in place of sampling noise from the signal path of the signal transmitting and processing system such as with the embodiments of FIG. 1 and 2. Noise source 101 is connected as an input source to the base of Field Effect Transistor 20′ with the output therefrom passed through resistor 49 to circuitry such as set forth with the embodiment of FIG. 1.

Referring now to FIG. 4 an alternate switch control system to that of FIG. 1 is shown with mechanical signal path switches 102 and 103 used in place of the resistor switches 72 and 71. Switch control 81′ is provided with a mechanical drive 104 connected to the switches 102 and 103.

Referring again to the embodiments of FIGS. 1 and 2 the PNP transistor 91 circuit is a one way signal coupling circuit isolating the noise sensing point 16′ from signal processor 25′ and the noise countering signal input location in the signal transmitting path through system 10′.

Whereas this invention is herein illustrated and described with respect to several embodiments hereof, it should be realized that various changes may be made without departing from essential contributions to the art made by the teachings hereof.

I claim:

1. In an automatic noise nulling circuit used with a signal transmission path system circuit: noise source means; substantially 90° signal phase shift vector resolver means connected for receiving a noise input from said noise source means; a first noise component magnitude adjuster transmission scalar circuit; first signal coupling means coupling a first noise vector signal from said vector resolver means to said first noise component magnitude adjuster transmission scalar circuit; a second noise component magnitude adjuster transmission scalar circuit; second signal coupling means coupling a second noise vector signal from said vector resolver means to said second noise component magnitude adjuster transmission scalar circuit; noise countering signal input means signal connected to said signal transmission path system circuit and signal connected to both said first and second noise component magnitude adjuster transmission scalar circuits; first and second synchronous detector circuits circuit connected for receiving signals from a signal sensing location in said signal transmission path system circuit; first circuit means interconnecting said vector resolver means and said first synchronous detector circuit ; second circuit means interconnecting said vector resolver means and said second synchronous detector circuit ; first voltage value adjusting circuit means interconnecting output means of said first synchronous detector circuit and said first noise component magnitude adjuster transmission scalar circuit; and second voltage value adjusting circuit means interconnecting output means of said second synchronous detector circuit whereby noise is null cancelled from the signal transmission path system with substantially 90° scalar vector inputs automatically magnitude varied with system sensed feedback.

2. The automatic noise nulling circuit of claim 1, wherein said noise source means is noise sampling circuit means connected to sample noise from said signal transmission path system circuit.

3. The automatic noise nulling circuit of claim 2, wherein said signal transmission path system circuit includes, a two wire signal transmission section; and said noise sampling circuit means includes resistive circuit means interconnecting the two wires of said two wire signal transmission section, and a tap connection in said resistive circuit means.

4. The automatic noise nulling circuit of claim 3, wherein said noise countering signal input means is a transformer with one primary coil and two secondary coils with each of the secondary coils common, respectively, to, and in series with, the two wires of said two wire signal transmission section.

5. The automatic noise nulling circuit of claim 4, wherein the two transformer secondary coils are balanced value coils.

6. The automatic noise nulling circuit of claim 4, wherein said transformer is a balanced transformer.

7. The automatic noise nulling circuit of claim 1, wherein one way signal coupling means is included in the signal path of said single transmission isolating the noise sensing location from the noise countering signal input location in the signal transmission path.

8. The automatic noise nulling circuit of claim 7, wherein said one way signal coupling means includes a transistor with at least two electrodes series connected in the signal through path.

9. The automatic noise nulling circuit of claim 1, wherein each of said first and second noise component magnitude adjuster transmission scalar circuits includes: a transformer with a primary coil an active part of said substantially 90° signal phase shift vector resolver and two secondary coils each connected at one end to a voltage potential reference source and interconnected at their other ends by two variable value electronic components having a common junction circuit connected to said noise countering signal input means; and adjustment means circuit connected to one of said synchronous detector circuits and positioned to control two variable value electronic components for increasing the value of one and decreasing the value of the other with change in the output of said synchronous detector connected thereto.

10. The automatic noise nulling circuit of claim 9, wherein each of said variable value electronic components is a light intensity variable resistor; said adjustment means circuit including a light generator adjacent each of said light intensity variable resistors; and bias control means simultaneously increasing current flow to one light generator and decreasing current flow to another light generator with charge in the output of the synchronous detector connected thereto.

11. The automatic noise nulling circuit of claim 9, wherein an operational amplifier is included in the circuit path out of each of said synchronous detector circuits.

12. The automatic noise nulling circuit of claim 11, wherein switch means is included in the circuit path between each of said synchronous detectors and an operational amplifier; and each of said operational amplifiers is designed to hold its output relatively constant for intervals of time that the switch in the circuit input path thereto is opened.

13. The automatic noise nulling circuit of claim 12, wherein said switch means are mechanical switches interconnected by a switch drive extended from a switch control device.

14. The automatic noise nulling circuit of claim 12, wherein said switch means includes light controlled resistive switches; individual light means adjacent each of said resistive switches; and with the individual light means circuit connected to switch control means.

15. The automatic noise nulling circuit of claim 9, wherein said substantially 90° signal phase shift vector resolver also includes an additional coil connected between said noise source and a primary coil of one of one of said transformers in said first noise component magnitude adjuster transmission scalar circuit.

16. The automatic noise nulling circuit of claim 1, wherein a phase shift equalizer circuit is included in the feedback circuit connection to said synchronous detectors.

17. The automatic noise nulling circuit of claim 1 including an amplifier in the feedback circuit connection to said synchronous detectors.

18. The automatic noise nulling circuit of claim 1, wherein said noise source means is an independent noise source separate from said signal transmission path system circuit.

* * * * *